United States Patent [19]

Milo

[11] 4,014,367
[45] Mar. 29, 1977

[54] PIPE CAP

[76] Inventor: August Milo, 1015 Schleifer Road, Hillside, N.J. 07205

[22] Filed: May 6, 1975

[21] Appl. No.: 574,999

Related U.S. Application Data

[62] Division of Ser. No. 516,324, Oct. 21, 1974, Pat. No. 3,949,787.

[52] U.S. Cl. .................................. 138/89; 220/318
[51] Int. Cl.² ......................................... F16L 55/10
[58] Field of Search ............. 138/89; 220/318, 322, 220/210; 292/259

[56] References Cited

UNITED STATES PATENTS

| 1,312,626 | 8/1919 | Grannis | 220/318 |
| 2,779,616 | 1/1957 | Houghton | 220/318 |
| 3,394,836 | 7/1968 | Millard | 220/210 |

Primary Examiner—Richard E. Aegerter
Assistant Examiner—L. Footland
Attorney, Agent, or Firm—Behr & Woodbridge

[57] ABSTRACT

An improved pipe cap comprises a cover and a U-shaped handle pivotally connected thereto. The handle includes a pair of rounded lugs which are adapted to engage an annular groove in the pipe end when the pipe cap handle is rotated toward its locking position. When the handle is rotated away from the locking position and towards the unlocking position, the lugs cooperate with the groove so as to cam the cover off of the pipe end. This novel camming action helps to overcome the resistance frequently associated with breaking the seal between a pipe end and a pipe cap.

An alternate embodiment of the improved pipe cap is fitted with lugs having a pronounced flat on one side. The alternative cap is intended to fit on a pipe adapter having a flat locking rim instead of a groove. The rim includes two slots 180° apart which are engagable by an appropriate wrench to thread the adapter onto a fill pipe. The lugs on the cap are located in such a manner that at most only one lug can fall into a slot. This feature prevents both lugs from becoming simultaneously stuck in the slotted ring.

5 Claims, 13 Drawing Figures

FIG. 1  FIG. 2
PRIOR ART
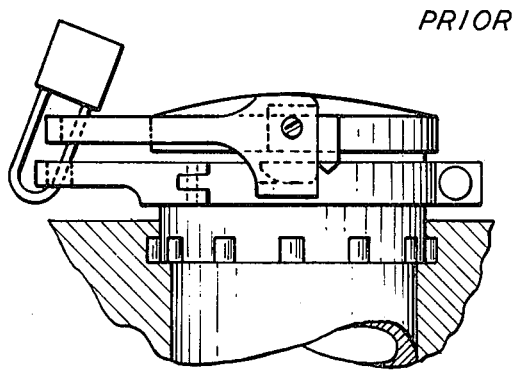
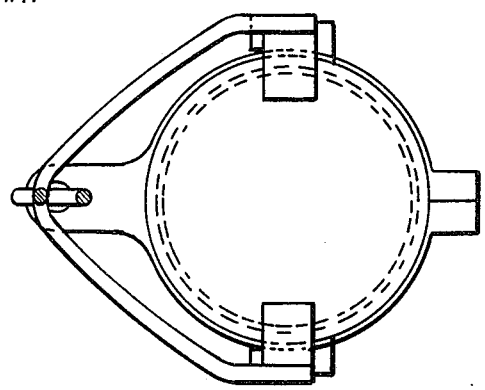
FIG. 4
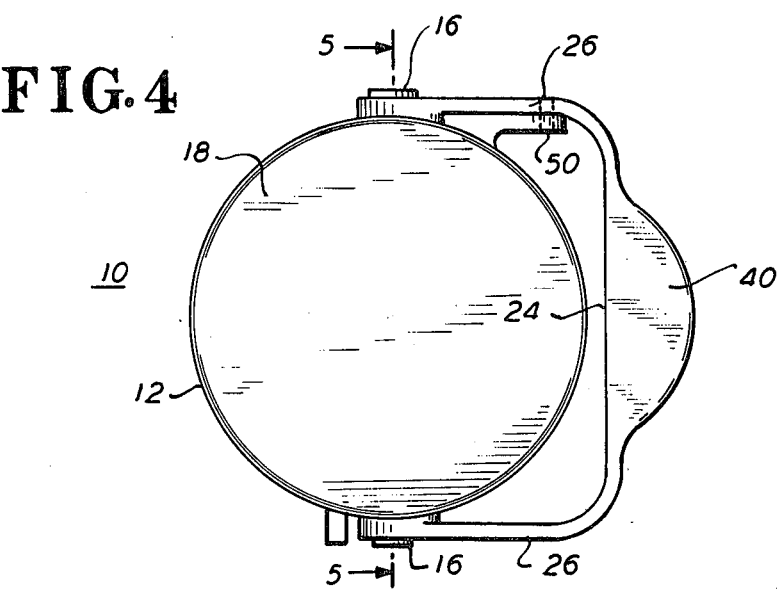
FIG. 3
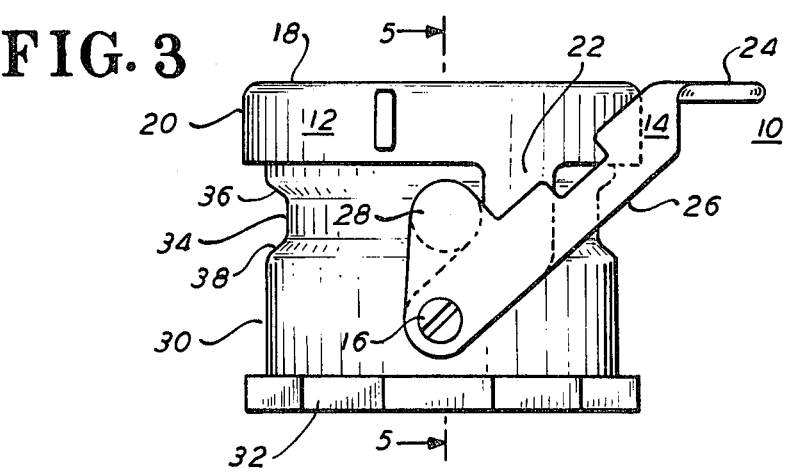

PIPE CAP

This is a division, of application Ser. No. 516,324, filed Oct. 21, 1974.

BACKGROUND OF THE INVENTION

1. Field of the Invention

This invention relates to the pipe capping art.

2. Description of the Prior Art

Several devices are known which are suitable for capping the end of the pipe. some of these devices are described in the following patents: Rafferty No. 2,684,779; Houghton No. 2,779,616; Millard No. 3,394,836; Nelsen No. 3,698,592; and Wilson et al. 3,722,549. Houghton and Millard are relevant to this invention in that they disclose pipe caps in which the cover is secured to the end of a pipe by means of a pivotal U-shaped handle. In particular, the Houghton invention is described as a "Cam CLosure." However, the camming action of the Houghton cap appears to be directed towards a camming closed motion and not a camming open motion. The patents to Nelsen and Wilson et al. are only of interest in that they disclose pipe caps that may be secured to a pipe having an annular receiving groove therein. To that extent, those patents are also similar to Wilson, U.S. Pat. No. 3,672,403.

The end of a fill pipe is, in some respects, similar to the mouth of a milk can or similar liquid container. Therefore, the following prior art patents may be relevant to the instant invention: U.S. Pat. Nos. Reynolds No. 707,011; Howell No 714,376; Varoga No. 832,194; Grannis No. 1,312,626; Vantroba et al. No. 3,268,254.

SUMMARY OF THE INVENTION

The invention comprises a pipe cap which is adapted to seal the end of a pipe. According to the preferred embodiment, the pipe to be capped includes a flat capping surface and an annular anchor groove into which the pipe cap locks. This type of pipe end is frequently found on fill pipes to which an adapter is added for the purpose of adapting the fill pipe to a pipe cap.

The pipe cap of the preferred embodiment includes a cover and a U-shape handle pivotally connected thereto. The cover includes a flat lid portion and a sidewall collar section extending in one direction therefrom. The U-shaped handle includes a center section and a pair of legs connected to opposite sides thereof. The ends of the legs are pivotally connected to an extension of the cover sidewall collar. Inwardly facing lugs are offset a slight distance on each of the leg sections of the handle. The lugs are designed to engage the annular groove in the pipe end. The annular groove includes an upper working surface and a lower working surface.

Then the cap is to be placed on the pipe, the handle is lifted straight upward so as to be vertical with respect to the plane of the cover lid. The cap can then be positioned on top of the pipe end such that the gasket within the cap cover comes in contact with the capping surface of the pipe end. With the handle in the vertical position, the groove engaging lugs are swung out of the way of the pipe end as the cap is placed in position. In order to lock the pipe to the cap, the handle is rotated downwardly, thereby drawing the lugs over the sidewall and into the annular groove. As the handle progresses downward, the lugs first come into contact with the upper working surface of the annular groove and in this fashion the cap cover is cammed closed. In the locked position, a hole in the handle coincides with a hole in an extension of the sidewall collar. When the two holes are in alignment the shackle of a lock or similar device may be passed therethrough and the cap may be permanently secured in this manner.

In the unlocking mode, the lock is, of course, unlocked and removed, and the handle is drawn upwardly in a direction opposite to the locking direction. In this mode, the lugs are drawn out of the annular groove and first come in contact with the lower working surface thereof. Continued rotation of the handle causes the lugs to exert pressure on the lower working surface threby tending to cam up the cap cover. This motion breaks the seal often associated with the contact between the capping surface of a pipe and its sealing gasket. Continued rotation of the handle completely draws the lugs out of the groove and once the handle attains a substantially vertical position the cap may be manually removed.

According to an alternative embodiment, the pipe cap is similar to the one previously described except that the lugs include a pronounced flat section on one side thereof. This embodiment is intended to fit upon a pipe adapter having a peripheral locking ring extended around the exterior of the adapter. The ring includes two slots 180° apart. The slots are intended to receive a tightening wrench which treads the adapter to the fill pipe. The lugs are offset in such a fashion that only one lug can fall into a groove at one time. Therefore, since it is impossible for both lugs to fall into the slots at the same time, it is less likely that the cap can get stuck in the slots in the locking mode.

It was a purpose of the present invention to provide a novel pipe cap which could be easily attached and removed from any vertical direction. The advantages of this invention will be more readily understood with reference to the following drawings.

BRIEF DESCRIPTION OF THE DRAWINGS

FIG. 1 is a vertical elevation of a fill tube cap according to the prior art.

FIG. 2 is a top view of the prior art fill tube cap of FIG. 1.

FIG. 3 is a side elevation view of the pipe cap according to the preferred embodiment.

FIG. 4 is a top view of the pipe cap of FIG. 3.

DESCRIPTION OF THE INVENTION

Figure 5:
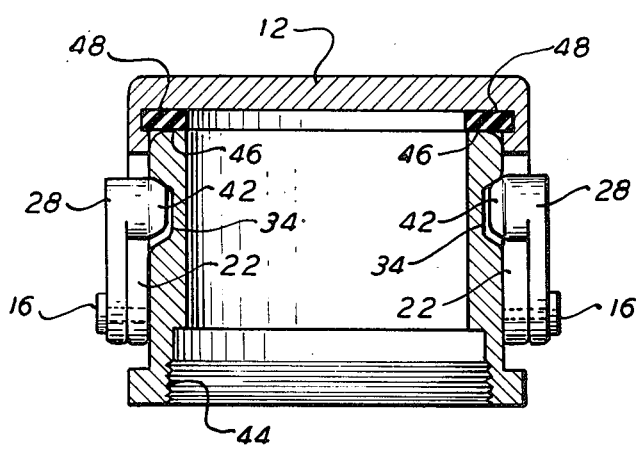
FIG. 5 is a cross-sectional view of the pipe cap illustrated in FIGS. 3 and 4 as seen from perspective 5—5.

It will be appreciated during the course of this description that like numbers will refer to like elements in the different drawings.

A typical prior art fill tube cap is illustrated in FIGS. 1 and 2. The prior art cap illustrated in FIGS. 1 and 2 is disclosed in the patent to Millard Pat. No. 3,394,836. The Millard pipe cap is similar in many respects to Houghton Pat. No. 2,779,616. Both Millard and Houghton are similar to the instant invention in that they include a cover element and a U-shaped handle connected to said cover element. Both devices are intended to close a circular opening. Unfortunately, such prior art pipe caps do not have the ability to satisfactorily engage a pipe having an annular groove therein. Additionally, it is not uncommon for the pipe end to become stuck to the cover of the pipe cap. This adhesion may be explained in terms of dirt and grime and the viscosity of the medium being stored. In order to overcome this resistance, it is frequently necessary to exert a considerable amount of pressure on prior art pipe caps in order to pry them loose. The present invention, according to the preferred embodiments, includes a novel lug engaging means which allows the cap to be easily removed from a pipe to which it may be stuck.

A side elevation of the preferred pipe cap may be seen in FIG. 3. The pipe cap 10 includes a cover member 12 and a handle member 14 pivotally connected to said cover member 12 at a pivot point 16. The cover member comprises a rounded lid portion 18, a sidewall collar section 20 and an extension 22 connecting the sidewall section 20 to the pivot point 16. The U-shaped handle includes a center section 24, a leg section 26, and a lug section 28. The lug section 28 is shown to be offset from the leg section 26.

The pipe cap assembly 10 is shown in its locked position on top of a fill pipe adapter 30. The adapter includes a polygon-shaped base 32 which includes threads on the inside thereof for being received on an appropriate fill pipe or the like. The adapter 30 includes an annular groove near one end thereof. The annular groove 34 includes an upper working surface 36 and a lower working surface 38.

The pipe cap 10 of FIG. 3 is shown in the locked position in which the lug means 28 has gone slightly over center so as to lock the cap to the adapter 30.

FIGS. 4 and 5 show the locked pipe cap of FIG. 3 from different perspectives. According to FIG. 4, it is clear that the center section 24 of the U-shaped handle 14 includes a flat surface section 40 thereon to which manual or foot pressure may be applied to open and close the pipe cap assembly. The clearance between cap 12 and handle 14 is about one-eighth of an inch (⅛ inch) in the locked position.

FIG. 5 is a cross-sectional view of the pipe cap of FIGS. 3 and 4 as seen from perspective 5—5. FIG. 5 shows interior details of the pipe cap assembly 10 that would not otherwise be visible from the outside. In particular, it discloses the nature of lug means 42 which engages annular groove 34. Lug means 42 are attached to offset lug section 28 and are adapted to be received within groove 34 in the manner illustrated. Lug means 42 comprises a pair of inwardly facing, opposing lugs which are slightly beveled so as to effeciently work against upper and lower working surfaces 36 and 38.

Threads 44 are shown at the interior of the base section 32. As previously described, threads 44 are designed to engage the threads in the tope of a fill pipe. Adapter 30 also includes an upper capping surface 36 which comes into sealing contact with the cover gasket 48 when the handle is brought into the locked position as shown in FIGS 3 – 5; pressure is brought to bear upon sealing gasket 48 which forms a fluid type seal between the upper capping surface 46 and the gasket 48. As seen in FIG. 5, the pivot point 16 actually comprises a pin passing through leg 26 and cover extension 22. A wide variety of alternative pivot connections could have been used instead.

Figure 6A:
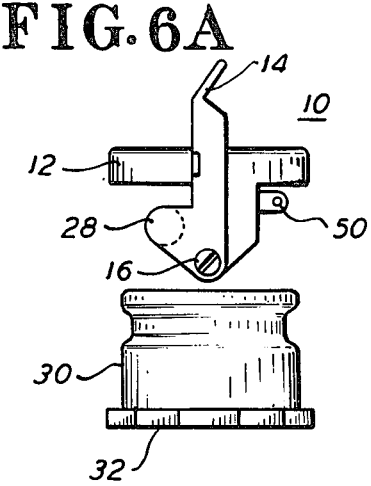
FIGS. 6a, 6b, 6c and 6d show the pipe cap assembly of FIGS. 3–5 as it is secured to an adapter element.
Figure 6B:
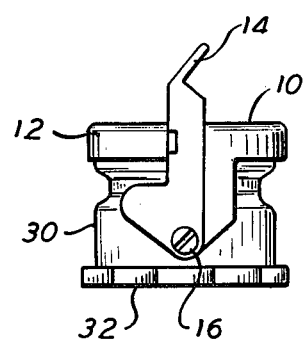
Figure 6C:
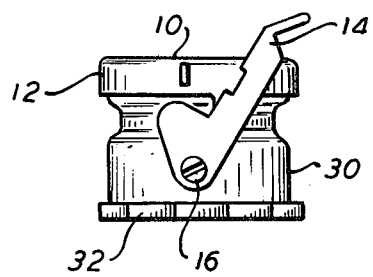
Figure 6D:
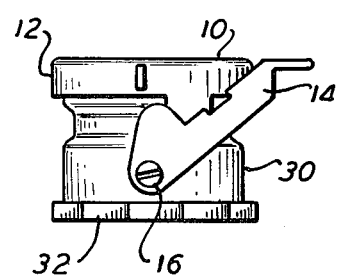

The capping and uncapping of assembly 10 will be more fully appreciated with reference to FIGS. 6a, 6b, 6c and 6d. According to FIG. 6a, the pipe cap 10 is just about to be lowered into position on top of adapter 30. From this perspective, a locking tab 50 is just visible and shown to be connected to one of the two cover extensions 22. When the handle is in the locked position, as shown in FIGS. 3 and 6d, the hole in locking tab 50 coincides with a hole in one of the two legs 26 of the U-shaped handle 14. With the two holes coinciding, it is possible to pass the shackle of a lock therethru and to secure the cap to the adapter in the locked position. Note that as the cap is placed upon the adapter that the lugs 42 are swung out of the way due to the offset of member 28. In other words, when the handle 14 is held in the verticle position relative to the plane of lid 18, the lugs 42 do not interfere with adapter 30 due to the offset of member 28.

The pipe cap 10 is shown in position on top of adapter 30 according to FIG. 6b. From this position, the handle is rotated 90° downwardly in order to lock the cover against the adapter.

In FIG. 6c, the handle is shown approximately halfway between the locking and unlocking position. At this point, the lug has just ridden over the sidewall of adapter 30, across lower surface 38 and into groove 34.

The lug means, 42, just comes into contact with the upper working surface 36 of the annular groove 34. As the handle is progressively brought downward, the lug means 42 impinges more and more upon the surface 36 and forces the cover securely down on top of the capping surface 46. Continued rotation of handle 14 causes the lug section 28 to go slightly over center. The over center position locks the cap to the adapter so that it cannot be inadvertently displaced. Of course, in the locked position, the cap is drawn tightly up against the adapter and the lid is in its lowest position. In the unlocking mode, the handle is drawn from the locking towards the vertical position. As this occurs, the motion of lug means 42 causes it to come into contact with the lower working surface 38 of annular groove 34. The impingement of lug 42 on lower working surface 38 pries the cover off of the working surface 46 and breaks the seal between gasket 48 and surface 46. Continued rotation of the handle to its vertical, upright position relative to the plane of the lid withdraws the lug means 42 from the annular groove 34 and allows the cap to be removed by simply pulling the handle upright.

It will be appreciated from reviewing the above description that the pipe cap is both cammed on and cammed off of the adapter. This feature is due in large part to the unique relationship between the lug means 42 and the groove 34. Note that there is a slight amount of play of the lug 42 within groove 34 so that the lug 42 will impinge upon either working surface 36 or 38, depending upon the direction of rotation of the handle 14. In contrast to many other prior art capping devices, the lug means 42 engages a locking detent above the pivot point of the handle, and not below it. In other words, the lug means is located between the pivot point and the cap lid when the cap 10 is in its locked position. The offset section 28 of the handle 14 allows the lug 42 to clear the adapter when the handle 14 is in the vertical position, but permits the lug 42 to engage the groove 34 when the handle is in the horizontal position. Additionally, the slightly domed shape of the lugs allows it to enter and exit from groove 34 smoothly and evenly.

Figure 7:
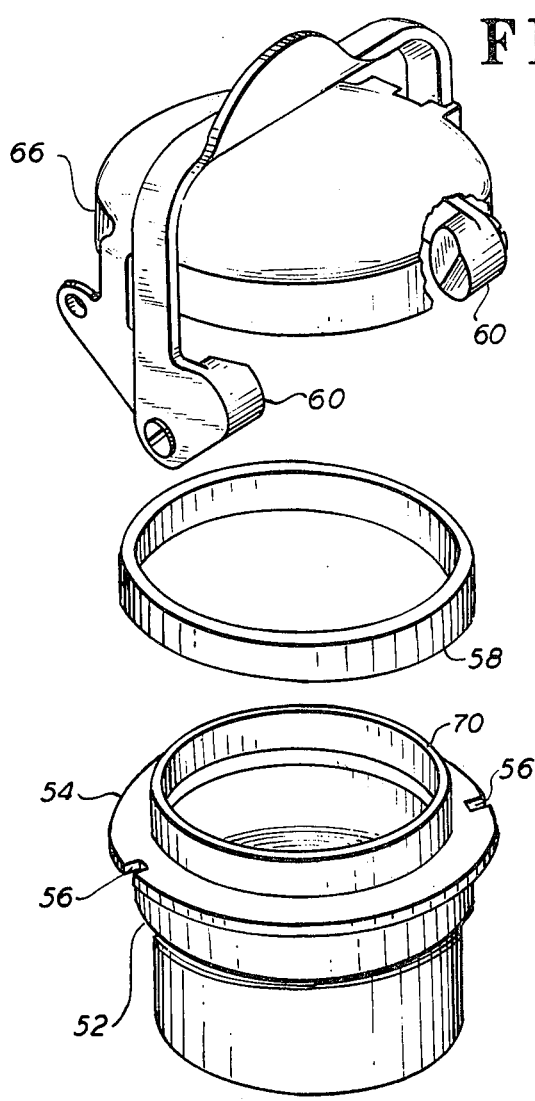
FIG. 7 is an exploded view of the pipe capping system according to an alternative embodiment.
Figure 8:
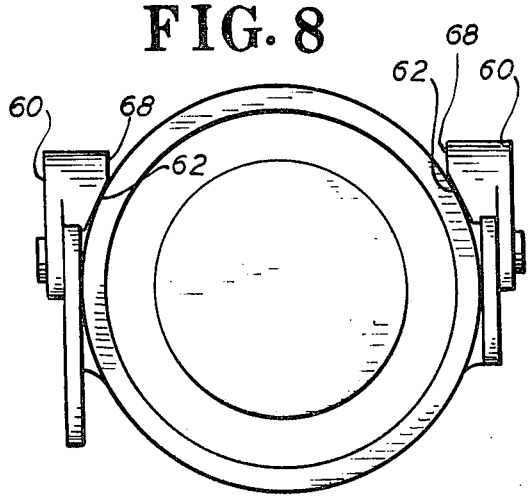
FIG. 8 is a bottom view of the pipe cap in FIG. 7 showing the clearance of the lugs when the handle is in the unlocked position.
Figure 9:
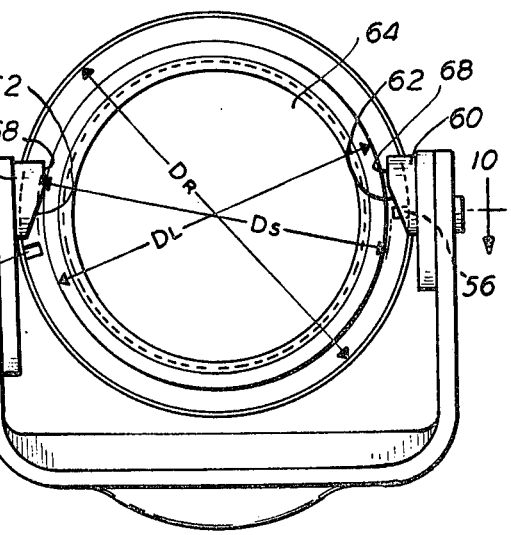
FIG. 9 is a bottom view of the pipe capping system of FIG. 7 showing a pipe cap in the locking position superimposed on an adapter.

A pipe capping system according to an alternative embodiment is shown in FIGS. 7, 8 and 9. FIG. 7 shows the system to include a pipe adapter 52, a sealing ring 58 and a pipe cap 66 having unique locking lugs 60. The cap 66 is similar to cap 10 except that the lugs 60 have a distinctly different shape. Cap 66 is intended to engage adapter 52 which is considerably different from adapter 30 described in FIGS. 1 – 6. Adapter 52 includes a flat locking rim 54 having apair of slots 56 located in the periphery thereof. The rim has a major outside diameter $D_r$. The slots 56 are exactly 180° apart on the rim 54 and separated by a distance $D_S$. The slots are adapted for engagement with the teeth of a tightening wrench. The tightening wrench is employed to secure the threads 64 of the adapter to matching threads on a standard pipe or other threaded conduit. Sealing ring 58 differs from sealing ring 48 which is illustrated in FIG. 5, in that sealing ring 58 is an independent cylindrical collar whereas sealing ring 48 is flatter and is retained within a groove in cap 10. Capping surface 70 is similar in purpose and function to capping surface 46 illustrated in FIG. 5.

The lugs 60 are cylindrical in shape and include an inward facing tip having two flat surfaces 62 and 68 thereon. Lugs 60 are separated by a distance $D_1$. The plane of surface 68 is generally parallel to the plane of handle legs 26. The plane of surface 62 is at an angle with respect to the plane of surface 68. That plane is roughly parallel to a plane tangential to the rim 54 of adapter 52 when the handle 26 is in the full unlocked position as shown in FIG. 8. In the full unlocked position the handle 26 stands directly upward from the cap and the lugs are positioned in such a manner that they clear rim 54 when the cap is lowered down upon adapter 52.

In operation, the cap 66 is positioned upon adapter 52 in the sequence illustrated in FIG. 7. As shown in FIG. 8, the lugs have been swung out of the way when the handle is in the full unlocked attitude. This avoids interference between lugs 60 and rim 54 when the cap is lowered into position. In order to accomplish locking the handle, it is swung downwardly in a manner previously described with respect to handle 14 of cap 10. The lugs 60 then come into engagement with the underside of rim 54. Continued rotation of the handle causes the lugs to go slightly over center and a stop on the cap causes the handle to come to rest in the fully locked position. The resilience of seal 58 provides the necessary springiness to maintain residual locking pressure between the cap and the adapter. Seal 48 of cap 10 provides the same function relative to adapter 30.

Figure 10:
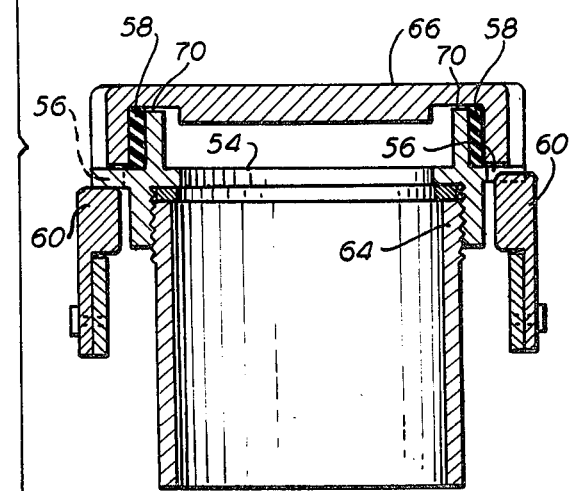
FIG. 10 is a cross-sectional view of the pipe cap illustrated in FIG. 9 as seen from perspective 10—10.

Cap 66 is illustrated in the fully locked position according to FIGS. 9 and 10. In these figures it is seen that one lug impinges a slot 56 while the other lug does not impinge or cover the other slot 56. It is very important that both lugs 60 do not fall into both slots 56 at the same time. If this happens, the cap is very difficult to remove. In order to overcome this problem the position of the lugs relative to the slots was changed so that only one lug can posibly fall into one slot at one time. As shown in FIGS. 9 and 10 if the right hand lug happens to fall into a slot, the position of the left hand lug is such that it can't fall into a slot. It is relatively easy to remove the cap if only one lug falls into a slot, but would be much more difficult if it were possible for two lugs to fall in. In general, when the cap is put on, neither lug will fall into a slot. However, if one lug does fall in, it is absolutely necessary that the other one does not. To prevent both lugs from being stuck in the slots the lugs are positioned at an angle A° of between 0° and 180° or 180° to 360° but not including 180°, relative to the angle of location of the slots. In other words:

$0° < A° < 180°$ and $180° < A° < 360°$.

The same consequence can be described in terms of the distance between the slots $D_s$ and the distance between the lugs $D_1$. Since the slots are at 180° with respect to each other they represent the maximum effective distance $D_s$ that two slots can have on a circular rim of diameter $D_r$. Therefore, since the lugs are not at 180° with respect to each other, the effective distance $D_1$ between them is less than the effective distance between the slots $D_s$. The term effective distance means substantially the closest distance of the lugs or slots to each other. The relation between $D_s$ and $D_1$ and can be described as follows:

$D_s > D_1$ for all values of $D_s$ and $D_1$.

The unlocking of the cap is achieved in the manner previously described with respect to cap 10, namely the handle is rotated in the opposite direction until rotation stops in the upright position with respect to the top surface of the cap. At the same time, the lugs 60 disengage rim 54 and the cap 66 can be lifted directly upward and off.

From the foregoing, it is obvious that the present invention offers many advantages over prior art pipe caps. In particular, the handle of the instant device lies flush with the surface of the cap when in the locked position and, therefore, does not rise above the surface of the cap. This is important because frost heave may cause the fill pipe assembly to rise and come into contact with the hole cover. This, in turn, may cause the cover to pop up. However, the problem is minimized by the present invention because there is greater clearance between the cover and the cap handle.

Conversely, when the handle is in the vertical or unlocked position as shown in FIGS. 6A and 6B, it is impossible to place the hole cover over the cap because the handle gets in the way and displaces the cover. This aspect of the invention serves the important function of signaling to the operator that the cap is improperly secured and must be locked.

The handle structure has the additional advantage of lying flush with the surface of the cap only when the cap is in the locked position. This feature allows the cap installer to tell instantly if the cap is locked for if the handle is not flush with the surface of the cap, then the cap must be partially or wholly unlocked. In many prior art caps it is difficult to verify locking because the handle may lock in an ambiguous attitude above the surface of the cap. Further advantages of this system include the fact that the instant pipe cap can assume any orientation with respect to the adapter providing, of course, that the cap is on level. This, in turn, means that the cap can be rotated a fully 360° with respect to the adapter and can be locked at any position of rotation. Also, due to the rugged and simplified construction of the handle, the cap can be locked either by manual pressure or by foot or by both. Typcially, the cap would be set upon the adapter by hand and then the handle rotated until the anchor means is suficiently engaged. At that point, the handle can be driven home either by hand or by foot. With many prior art caps, the use of foot pressure is not desirable. Finally, it will be noted from the drawings that the clearance between the handle 14 and the cap 12 is on the order of about one eighth of an inch (⅛ inch) when in the locked position. The small clearance allows for a pipe cap of relatively compact and easily handleable size.

While the invention has been particularly shown and described with reference to the preferred embodiment thereof, will be understood by those skilled in the art that various changes in form and detail may be made therein without departing from the spirit and scope of the invention.

I claim:

1. a pipe capping system for capping the end of the pipe, said system comprising:
   a pipe end having an exterior, circular rim section of major diameter $D_r$ said rim section including flat upper and lower surfaces thereon, said rim section further including two slots located on said diameter $D_r$, said slots being separated by a distance $D_s$; and,
   a pipe cap including a cover for sealing said pipe end an extended arm, and a handle pivotally connected to the face of said extended arm by a pivot means, said handle including a rim section engaging lug means for locking said cover in a locking position against said flat lower surface of said rim section when said handle is rotated in a first direction and for unlocking said cover to an unlocked position when said handle is rotated in a second direction, said lug means being located a distance $D_1$ apart, where
   $D_s > D_1$ for all values for $D_s$ and $D_1$,
   said lug means comprising a pair of inwardly facing, opposing lugs, said lugs including at least one substantially flat surface thereon, said lug means being located between said pivot means and said rim section when said handle is in said locking position.

2. The pipe capping system of claim 1 wherein said cover includes a cylindrical peripheral sidewall and a substantially flat top; and,
   said substantially flat surface of said lugs is substantially tangential to the cylindrical peripheral sidewall of said cover when said handle is in the unlocked position.

3. The pipe cappping system of claim 2 wherein a cylindrical sealing gasket is juxtaposed against said cover and said rim.

4. The pipe capping system of claim 3 wherein said pipe end comprises a conventional pipe adapter.

5. A pipe cap comprising:
   a cover including a cylindrical peripheral sidewall, a substantially flat top and an extended arm; and,
   a handle pivotally connected to the face of said extended arm by a pivot means, said handle including a lug means for locking said cover in a locking position when said handle is substantially parallel with respect to said flat top and for unlocking said cover to an unlocked position when said handle is substantially vertical with respect to said flat top, said lug means comprising a pair of inwardly facing, opposing lugs, said lugs including at least one surface thereon which is substantially tangential to the cylindrical peripheral sidewall of said cover when said handle is in the unlocked position, said lug means being located between said pivot means and the top of said cover when said handle is in the locking position.

* * * * *